Jan. 5, 1932.    T. M. E. B. DE TESTA    1,840,227
CINEMATOGRAPHIC PHOTOGRAPHING APPARATUS
Filed Oct. 10, 1929
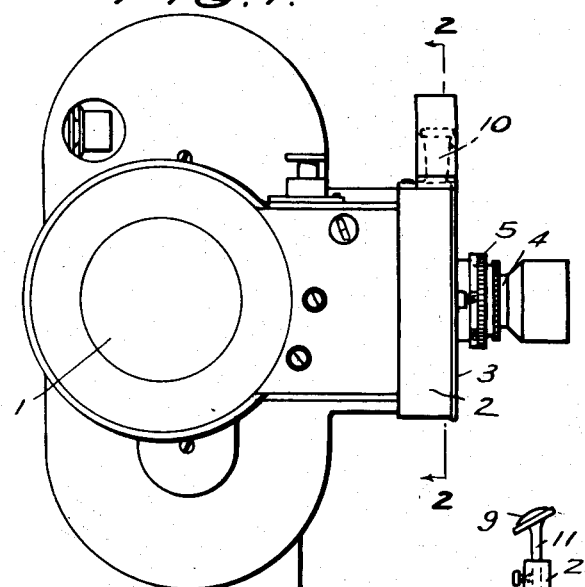
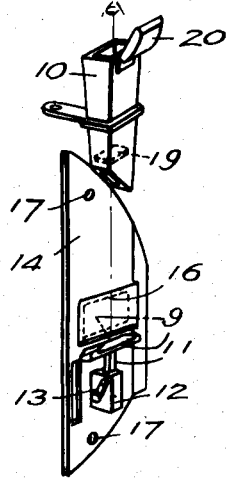
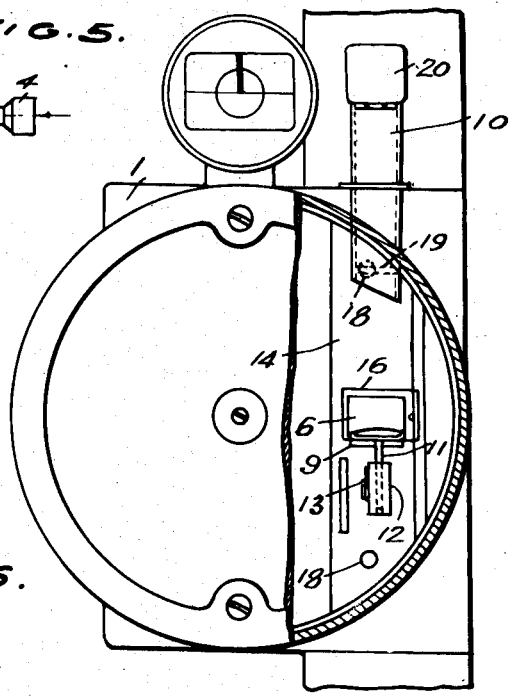
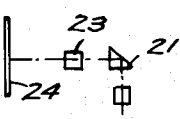
INVENTOR.
T. M. E. B. DE TESTA
BY
Langner, Perry, Card & Langner
ATTORNEYS.

Patented Jan. 5, 1932

1,840,227

UNITED STATES PATENT OFFICE

THEODORUS MARIE ERASMUS BARON DE TESTA, OF THE HAGUE, NETHERLANDS

CINEMATOGRAPHIC PHOTOGRAPHING APPARATUS

Application filed October 10, 1929. Serial No. 398,726

The invention relates to a cinematographic photographing apparatus, and has for its object to facilitate the focussing of the image by the application of simple means.

The difficulty of the existing cinematographic photographing apparatuses, more especially the so-called "amateur-kinos" is that the image must be focussed at random, i. e. the distance from the apparatus to the image is estimated, and the objective is adjusted, so as to make the numerical value indicated by the objective correspond to the estimated distance. It is clear that in doing so there are numerous errors, and that films are photographed unsharply. This danger of photographing unsharply increases in proportion to the aperture of the lens being larger.

According to the invention this difficulty is eliminated by means of for instance a convex mirror which is mounted so as to catch the image thrown on the film by the objective, and then reflect it in an observation window.

By applying this principle it is possible to accurately focus the image on the film itself, so in the plane in which it has to be retained, without any notice having to be taken of the graduated distance scale on the objective.

When the adjustment has been effected, the observation window may be shut off, so as to prevent any foreign light from penetrating.

Within the scope of the invention the focussing device may be executed in various ways; a good construction is the one in which the mirror is arranged in front of the observation window out of the path of the rays passing through the objective at acute angles with that window and the axis of the objective, and in which there is on the same side of the observation window, but on the other side of the ray course of the objective, an observation window adapted to be shut off.

The mirror may be adjustable so as to conform to the apparatus, and in the observation window there may be a magnifying device, by means of which, and this is very useful, especially in case of so-called narrow films, an enlargement of the image thrown on the mirror is obtained. The construction of the observation window may be such as to permit viewing the mirror in a straight line, or in such a way that the reflected radiation is broken in one or more prisms, in order to permit the choice of the place, where the eye is put either in front of, or over the window.

A device according to the invention may be constructed very compactly, and be applied to apparatuses which are provided with lenses having a slight focus distance, for instance 1 inch, whereas incorporation in existing apparatuses is feasible. The invention consequently also comprises a mirror with support and observation window, adapted to be arranged in a cinematographic photographing apparatus.

The invention will be more fully understood with reference to the drawings showing some embodiments by way of example.

Fig. 1 is a schematic side elevation of a so-called "amateur-kino" for narrow films, provided with a device according to the invention.

Fig. 2 is a vertical cross-section on a larger scale according to the line II—II in Fig. 1 of a portion of the apparatus, containing the device according to the invention.

Fig. 3 is a corresponding vertical longitudinal section at the place of the observation window.

Figure 3a shows a modified arrangement of the reflecting mirror.

Fig. 4 shows a perspective view of a mirror with support and window for use in a cinematographic photographing apparatus.

Fig. 5 illustrates schematically the ray course in a modified embodiment according to the invention.

Figure 6 shows schematically a modified embodiment according to the invention.

In the figures the photographing apparatus as a whole is denoted by 1. It comprises a front piece 2, which contains the film-operating-mechanism, and which is closed by a cover plate 3, behind which the revolving shutter turns, and in which an aperture has been left for the objective 4 which in this example has a very short focus distance, for instance of 1 inch. The objective has a mechanism 5 for adjusting the distance, and is aligned right in front of the image window 6 (Figs. 2 and 3). Behind this window the film 7 is moved in some way or other; the sensitive side 8 faces the window.

According to the invention a convex or minifying mirror 9 is arranged in such a way that it catches the image thrown on the film 7 by the objective 4, and reflects it towards an observation window 10. The mirror may be of metal foil and be made electrically; it is mounted on a square stem 11, which is vertically adjustable in a sleeve 12 and held by a spring pawl 13. This sleeve is fastened to a plate 14, which is clamped between the image window panel 15 and the cover plate 3. The plate 14 has, among other things, an image window 16 and two centering apertures 17, 17 for pins 18, 18 on the cover 3, engaging corresponding apertures in the image window panel 15.

The stem 11 of the mirror may also be fastened directly in a box 22 of the cover plate, as shown in Figure 3a.

The observation window which may have various shapes, consists in this example of a square tube 10, containing a small magnifying lens 19, and provided with a light protecting cap 20.

According to Fig. 5 a prism 21 is arranged in the path of the rays reflected by a mirror 9, by means of which prism the image on the mirror 9 may be viewed from another place.

The rays reflected by a convex or minifying mirror 9 might be caught, for instance, through a set of magnifying lenses 23. on a ruby-red ground glass 24, as shown in Figure 6, and thus one might focus the real image obtained on the said ground glass.

In carrying out the invention the objective, as far as the various distances are concerned, need not be gauged, which constitutes an advantage. Besides this, the objective, as regards the focus, need not be mounted with great accuracy with respect to the film image area, as even in the case of objectives having a very small focus distance, the image may always be focussed very accurately on the film itself.

I claim:—

1. Cinematographic apparatus comprising an observation window, a mirror located to catch the image thrown by the objective on the image surface of the film itself and to reflect it towards said observation window, said mirror being arranged in front of the image window, out of the path of the rays passing through the objective, at an acute angle to the image window and to the axis of the objective, and on the same side of the image window, but on the other side of the path of the rays, an observation window, adapted to be shut off, is arranged.

2. Cinematographic apparatus comprising an observation window, a mirror located to catch the image thrown by the objective on the image surface of the film itself and to reflect it towards said observation window, said mirror being arranged in front of the image window, out of the path of the rays passing through the objective, at an acute angle to the image window and to the axis of the objective, and on the same side of the image window, but on the other side of the path of the rays passing through the objective, an observation window adapted to be shut off, is arranged, and means for adjusting said mirror.

3. Cinematographic apparatus comprising an observation window, a mirror located to catch the image thrown by the objective on the image surface of the film itself and to reflect it towards said observation window, said mirror being arranged in front of the image window, out of the path of the rays passing through the objective, at an acute angle to said image window and to the axis of the objective, and on the same side of the image window, but on the other side of the said path of rays, an observation window, adapted to be shut off, and containing a magnifying device, is arranged.

4. Cinematographic apparatus comprising an observation window, a mirror located to catch the image thrown by the objective on the image surface of the film itself and to reflect it towards said observation window, said mirror being arranged in front of the image window, and out of the path of the rays passing through the objective, at an acute angle to said image window and to the axis of the objective, and on the same side of the image window, but on the other side of the said path of rays, an observation window, adapted to be shut off, and comprising a ray-deflecting means, is arranged.

In testimony whereof I affix my signature.

THEODORUS MARIE ERASMUS BARON de TESTA.